United States Patent [19]

Hirahara

[11] E Re. 29,030

[45] Reissued Nov. 9, 1976

[54] FLEXIBLE CABLE DRY PEELER

[75] Inventor: Katsuji Hirahara, Santa Clara, Calif.

[73] Assignee: FMC Corporation, San Jose, Calif.

[22] Filed: Nov. 3, 1975

[21] Appl. No.: 627,985

Related U.S. Patent Documents

Reissue of:

[64] Patent No.: 3,854,395
Issued: Dec. 17, 1974
Appl. No.: 331,403
Filed: Feb. 12, 1973

[52] U.S. Cl. ..... 99/630; 99/624; 99/626

[51] Int. Cl.[2] ..... A23N 7/02; A23N 7/10

[58] Field of Search ..... 99/584, 623, 624, 626, 99/627, 629, 630; 241/273.3; 83/651.1

[56] References Cited

UNITED STATES PATENTS

| | | | |
|---|---|---|---|
| 281,512 | 7/1883 | Hudson | 99/626 X |
| 2,208,239 | 7/1940 | Andersen | 99/626 |
| 2,772,471 | 12/1956 | Leng | 99/623 X |
| 3,480,057 | 11/1969 | Wilhelm | 99/584 X |

FOREIGN PATENTS OR APPLICATIONS

| | | | |
|---|---|---|---|
| 146,065 | 11/1902 | Germany | 99/623 |

*Primary Examiner*—Richard C. Queisser
*Assistant Examiner*—Charles Gorenstein
*Attorney, Agent, or Firm*—C. E. Tripp

[57] ABSTRACT

A dry peeler is provided for food products such as vegetables, potatoes or the like which have had their skins softened and loosened such as by a caustic treatment bath. The dry peeler is formed as a rotary cylindrical cage having an abradant surface provided by an envelope of axially extending, circumferentially spaced, parallel, braided stainless steel wire cables, stretched between axially spaced rings, with a screw conveyor fitting within the envelope of cables. Both the cage of cables and the screw are rotated and the flexible cables abrade off and undercut a high percentage of the skins of the pre-treated products without the addition of water during the peeling process. Alternate cable supporting rings are rotatably adjustable to vary the tension on the cables.

7 Claims, 17 Drawing Figures

FIG_5
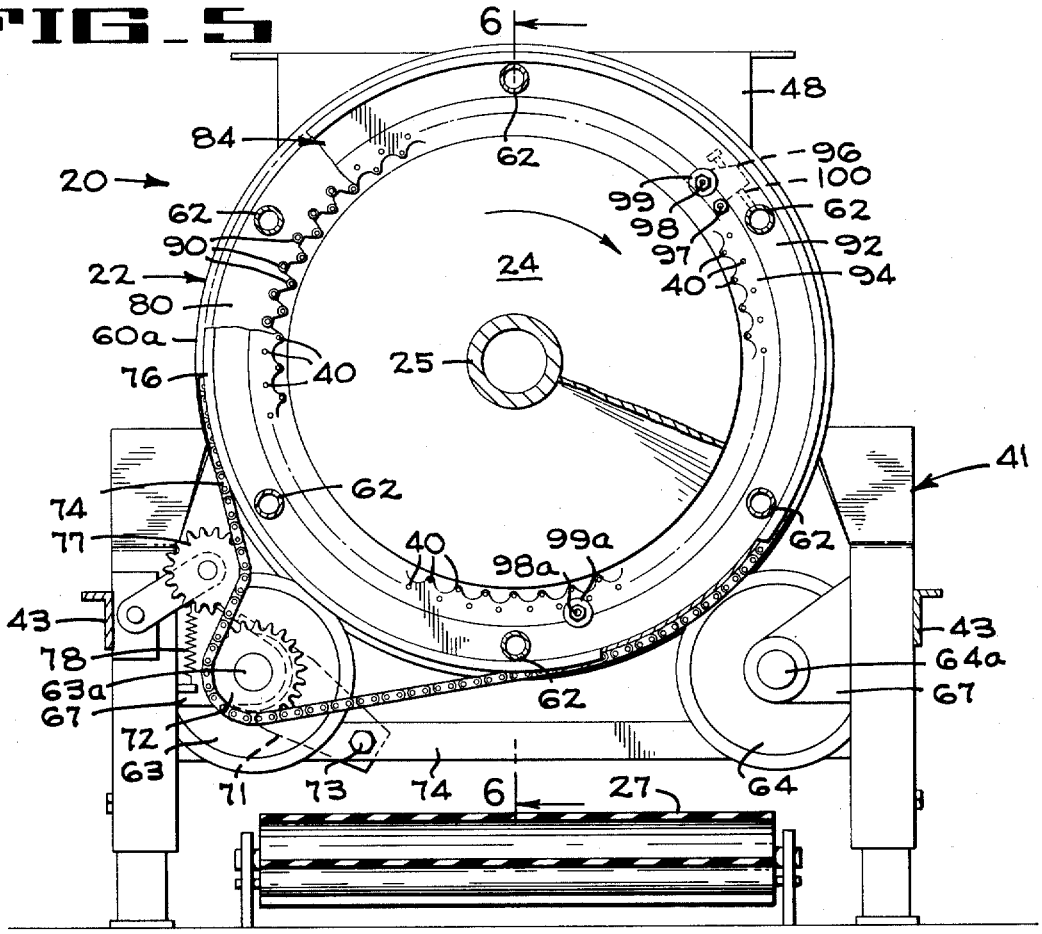
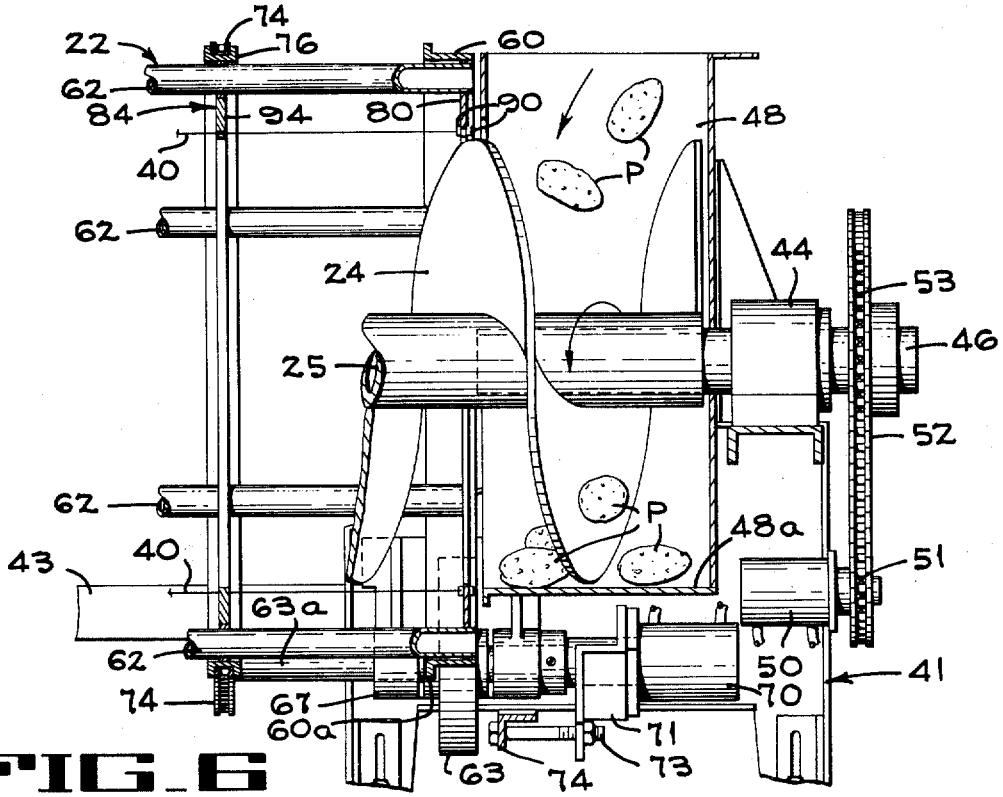
FIG_6

FLEXIBLE CABLE DRY PEELER

Matter enclosed in heavy brackets [ ] appears in the original patent but forms no part of this reissue specification; matter printed in italics indicates the additions made by reissue.

DESCRIPTION OF PRIOR ART

This invention is an improvement of the peeling apparatus of the U.S. Pat. to Wilhelm, No. 3,480,057, filed Nov. 25, 1969. In the Wilhelm patent, caustically treated fruit or vegetables such as potatoes are propelled by an internal screw conveyor through a rotating cylindrical screen having a mesh formed of woven strands, punched sheets or expanded metal. In the event woven strands are employed, the strands are formed from double-crimp, heavy black iron wire having a diameter of 0.148 inches and provide openings ¾ inch square. After being peeled without the addition of water in the aforesaid rotating screen, the products are passed through a wash section wherein those portions of the peel not removed dry are finally removed for providing completely peeled products.

One of the problems associated with the Wilhelm construction is that the caustically treated peelings, such as potato peels or the like, are still somewhat wet or moist when they pass through the dry peeling section of a peeler and as a result, the woven or mesh screen of Wilhelm with its ¾ inch openings, becomes plugged or loaded up by the peelings, and hence efficiency of the apparatus drops of a degree wherein it cannot operate without frequent washing or cleaning. Since the purpose of the invention is to minimize the amount of water that is employed in connection with the major portion of the peeling operation, that is, the purpose is to reduce the ratio of the amount of organic material entrained in the waste water leaving the cannery or processing plant, the need for frequent washing of square woven mesh screens, such as the screen of Wilhelm, does not fully obtain the objective of the dry peeling process, which is to minimize the ratio of peels or other organic material to the water that must go to waste from the plant. This characteristic of the Wilhelm screen also increases the down time of the peeler, a substantial disadvantage during a busy canning or processing season.

Another objection to the Wilhelm device is that the nature of the abradant screen is such that it not only removes the caustically loosened peels but before plugging it removes enough of the underlying flesh of the fruit, vegetables, potatoes or the like to reduce the yield and since these are high tonnage operations small reductions can, in yield, for each product over a canning season, represent a substantial total loss of product.

Hirahara U.S. Pat. No. 3,602,282, issued Aug. 3, 1971 shows a dry peeler formed of a vibrating coarse, square mesh rope netting.

Other patents, less pertinent than the aforesaid Wilhelm patent, include Krimo U.S. Pat. No. 1,312,332, Aug. 5, 1919 which dry peels scalded tomatoes between a pneumatic tube and a ribbed belt (FIG. 12) or a revolving disc screen (FIG. 5). Scovill U.S. Pat. No. 719,617, Feb. 3, 1903, dry peels heat blistered tomatoes on inclined, oppositely moving ribbed belts.

Kilburn et al. U.S. Pat. No. 2,847,334, Aug. 12, 1958 loosens and ruptures the skin of lye treated vegetables on a woven wire belt running in a pressurized stream chamber (FIG. 3).

Strause U.S. Pat. No. 2,207,903, July 16, 1940 dry peels potatoes using a rotary bottom disc moving at 250–300 RPM that abrades the potatoes against the inside of a fixed cylinder 3 that has an abrading surface formed like a nutmeg grater (Col. 1, line 50). Other grater type devices appear in Zeiger U.S. Pat. No. 89,190, Apr. 20, 1868 and Shaefer U.S. Pat. No. 1,641,993, Sept. 13, 1927.

Graham U.S. Pat. No. 3,547,173, December 1970, dry peels lye treated potatoes with three rubber fingered rollers running at 400–600 RPM. Sijbring U.S. Pat. No. 3,460,162, Aug. 5, 1969 dry peels potatoes by feeding them through a rotating drum having an annular array of rotary brushes. This type of peeler soon loads up without constant flushing during operation.

SUMMARY OF THE INVENTION

The dry peeler case of the present invention has the following advantages over prior dry peelers, such as that of the Wilhelm patent and other patents mentioned above:

a. Requires no water spray at the dry peeler.

b. Prolonged high tonnage operation without excessive peel build up and without clogging and reduction of effectiveness.

c. Adherent peelings readily removed from the dry peeler while using relatively small amounts of cleaning water.

d. Minimization of flesh removal, that is, increased yield.

e. Short and infrequent down times for cleaning the cage.

f. High tonnage throughput.

The above features and advantages of the dry peeler of the present invention will be described in connection with a potato peeler, by way of example. These advantages are obtained by employing an abradant product receiver or support formed of elongated, flexible wires that are laterally spaced to provide the abradant surface. The receiver is moved laterally relative to the products and means are provided to move the products longitudinally along the laterally moving cables. Preferably, the wires are braided wire cables formed in a cylindrical envelope and are supported at intervals on axially spaced rings, so that the entire envelope of cables forms a cage that is rotated to tumble and abrade and undercut the potato skins. In the cylindrical cage embodiment, the potatoes are propelled through the rotating envelope or cage of cables by an internal, large pitch screw conveyor, which rotates at about the same speed as the speed of rotation of the cage of cables.

However, the rates of rotation of the screw conveyor and the cage may differ in order to modify the rate of through-put of the apparatus. The brading cables are preferably formed of braided stainless steel wire about one-sixteenth inch in diameter and the cables are circumferentially spaced about three-fourths inch. The distance between the intermediate rings that support the cables is 12 or more inches so that although the cables can be circumferentially spaced as close as three-fourths of an inch there is no mesh of cross cables or the like to encourage peel build up and clogging. Enough of the ring assemblies through which the cables are stretched are provided to provide a total length of about 10 feet of dry peeling structure, and the diameter of the envelope or cage of cables is about 26 inches. Thus, in the preferred embodiment by rotating the cage of cables at a relatively slow speed such as 20–25 RPM, and by turning the internal propelling screw at about the same speed, a relatively high tonnage, nonclogging dry peeler is obtained which is operated without a water spray over a relatively long period of time before shut down for cleaning. Since the cables are stretched between rings that are 12 or more inches apart, the tension of the cables can be adjusted so that they are deflected somewhat by the potatoes during the peeling process. This increases the length of contact of the individual cables with the surfaces of the potatoes (or other vegetables), and reduces cutting and marring of the surface of the product. The cable deflection has also been found to reduce the amount of flesh removed along with the skins and hence to increase the yield. The apparatus may remove as much as 85–90% of the skins of potatoes, the skins of which have been steam loosened or caustically treated (for example) and requires no infra-red heating or pre-treatment other than the conventional treatment in a steam bath or a caustic bath such as the heated lye bath, commonly employed in the industry.

BRIEF DESCRIPTION OF THE DRAWINGS

FIG. 5 is an enlarged section of the dry peeler taken on line 5—5 of FIG. 4.

FIG. 6 is a section taken on line 6—6 of FIG. 5 through the receiving end of the dry peeler.

OVERALL DESCRIPTION OF A PEELING SYSTEM

Although the peeling system of the present invention has utility for various vegetables, the embodiment herein illustrated and described in detail is employed for the dry peeling of caustically treated potatoes.

Figure 1A:
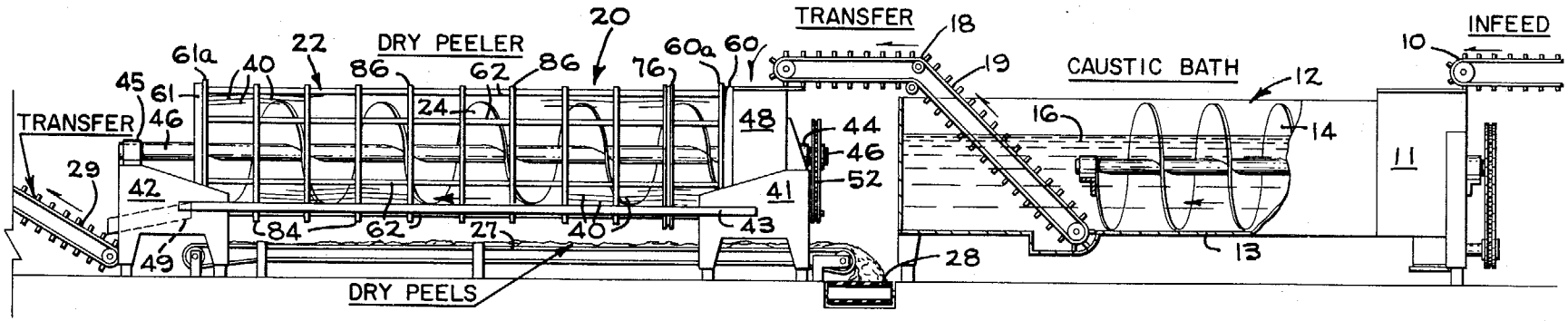
FIGS. 1A and 1B taken together are side elevations of a dry peeling system embodying the present invention.
Figure 1B:
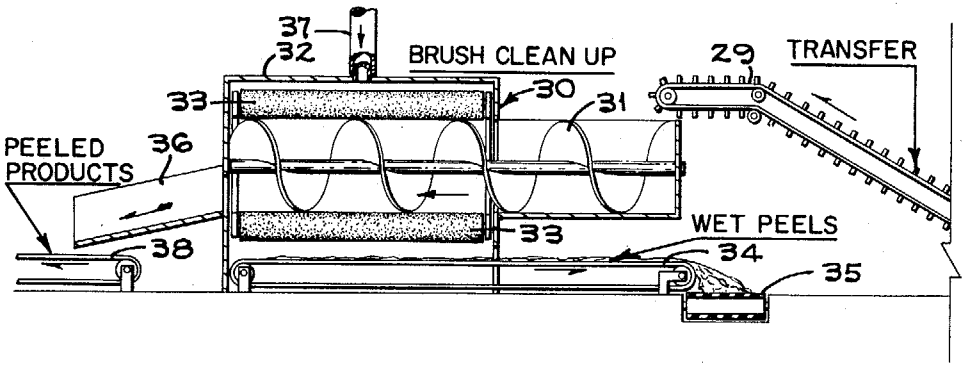

FIGS. 1A and 1B, taken together, illustrate an overall system for the dry peeling of potatoes embodying the dry peeler of the present invention. The vegetables are brought into the system on an infeed conveyor 10 and drop into the hopper 11 of a caustic bath unit 12. It is to be understood that the manner in which the skins of the potatoes are loosened by pre-treatment is not critical to the present invention and the caustic bath illustrated is only one of any number of conventional type baths that can be employed in connection with the present invention.

The caustic bath unit 12 includes a tank 13 mounting a rotating conveyor screw 14 immersed in caustic liquid 16, which may be, for example, a lye solution having 10–15 percent by weight of lye heated to a temperature of about 180°–190° F. After their skins are softened or loosened by immersion in the caustic bath 16, the potatoes are lifted from the bath by an elevating transfer conveyor 18 and drop into the dry peeler 20 by the present invention. The elevating reach 19 of conveyor 18 drains excess caustic back into the tank 13.

The dry peeler 20 of the present invention, in the embodiment illustrated, comprises a rotating abrasive cage 22 which mounts the cables 40 of the present invention in a manner to be described presently. Concentric with and substantially filling the cage 22 is a helical conveyor screw 24 which is rotated at approximately the same speed as the cage 22 in a manner to be described presently. The diameter of the cage of cables 40 is about 26 inches and that of the screw about 24 inches. The tumbling of the potatoes and removal of the potato skins is provided by the interaction of the cables 40 of the rotating cable cage 22 and the potatoes as the helical conveyor 24 forces the potatoes through the rotating cage. The cables 40, which are about one-sixteenth inch in diameter, provide a combined abrasion and cutting action that removes the caustically loosened skins as a relatively dry sludge which drops freely between the cables onto a take-away conveyor 27 running beneath the dry peeler. The take-away conveyor 27 deposits the relatively dry sludge onto a cross running take-away conveyor 28 for disposal by burning or other means, as explained in the aforesaid Wilhelm patent. It is to be noted that no water sprays are provided in connection with the dry peeler 20, it being an important feature of an invention of this type that a minimum of water be incorporated with the skins or peels removed by the dry peeler and falling on the conveyor 27, so that disposal of these peels without use of the sewage system of the processing plant is facilitated. The dry peeler 20 will remove about 85–90 percent of the skins from the potatoes and will direct the peeled potatoes to a transfer conveyor 29. As seen in FIG. 1B the transfer conveyor 29 deposits the peeled potatoes into a brush clean up device 30 wherein the skin portions not previously removed (usually located at the eyes of the potato) are finally removed. As in the case of the skin loosening apparatus 12, the details of the clean up device 30 are not critical to the present invention and the one illustrated is presented only by way of an example. For example, the brush clean up device includes a helical screw conveyor 31 that advances the substantially peeled potatoes through a housing 32 that contains a rotating annular array of brushes 33, the brushes themselves also being rotatable on their supports. A brush clean up device of this type is well known in the art and the mechanism for operating it is not critical to the invention and hence is not disclosed in detail.

The brush clean up device 30 is connected to a source of spray water by a conduit 37 in a manner well known in the art and the wet peel portions removed by this device fall onto a wet peel conveyor 34 which delivers this material to a second take away cross conveyor 35. It is to be understood that although the peel portions removed in the device 30 (usually at the eyes of potatoes) are substantially wetter than those removed in the dry peeler 20. The actual weight of peel portions removed in the clean up device 30 relative to the total weight of the peels removed by the dry peeler 20 is very small, and hence the disposition of the wet peel material falling on the conveyor 34 provides a relatively insignificant problem. The completely peeled potatoes are discharged by a chute 36 onto a peeled product conveyor 38 which carries the peeled potatoes or other vegetables to conventional processing apparatus.

GENERAL DESCRIPTION OF THE DRY PEELER

Figure 3:
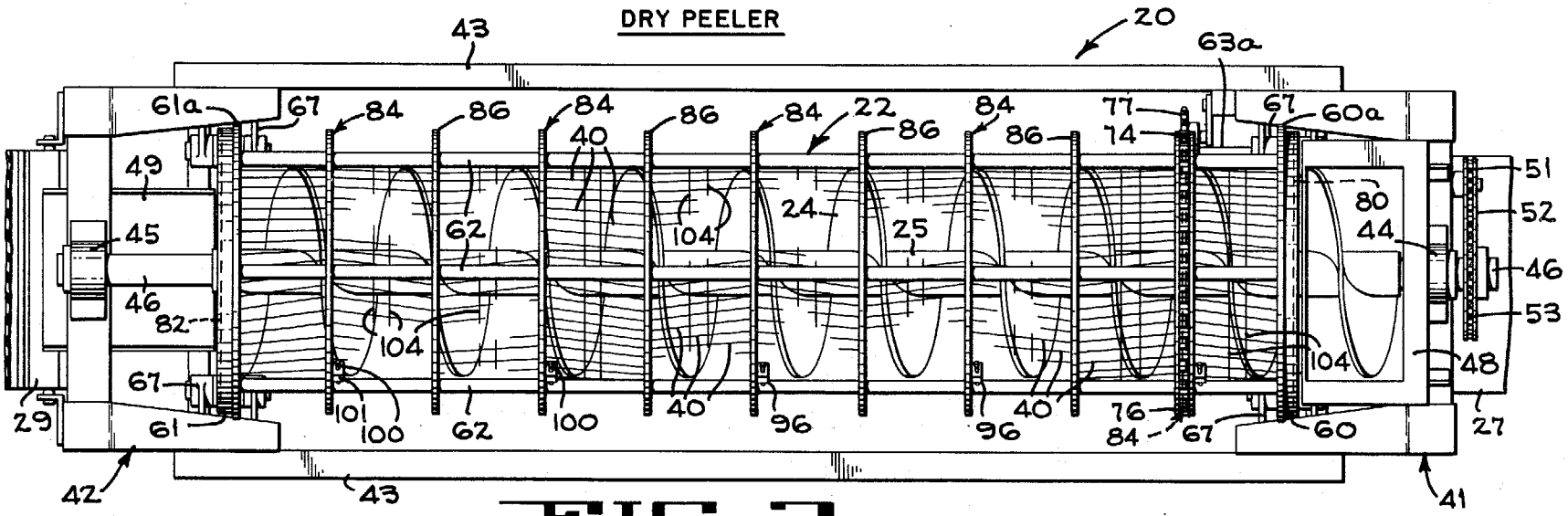
FIG. 3 is a plan of a dry peeler embodying the invention.
Figure 4:
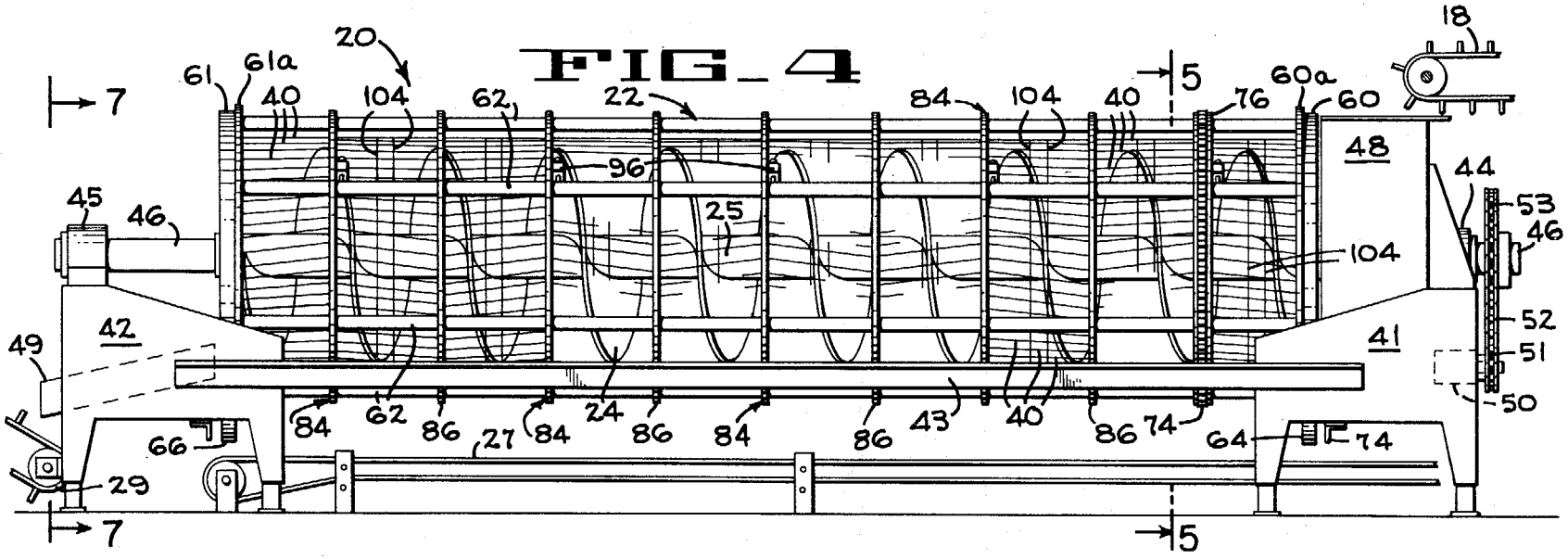
FIG. 4 is a side elevation of the dry peeler.
Figure 8:
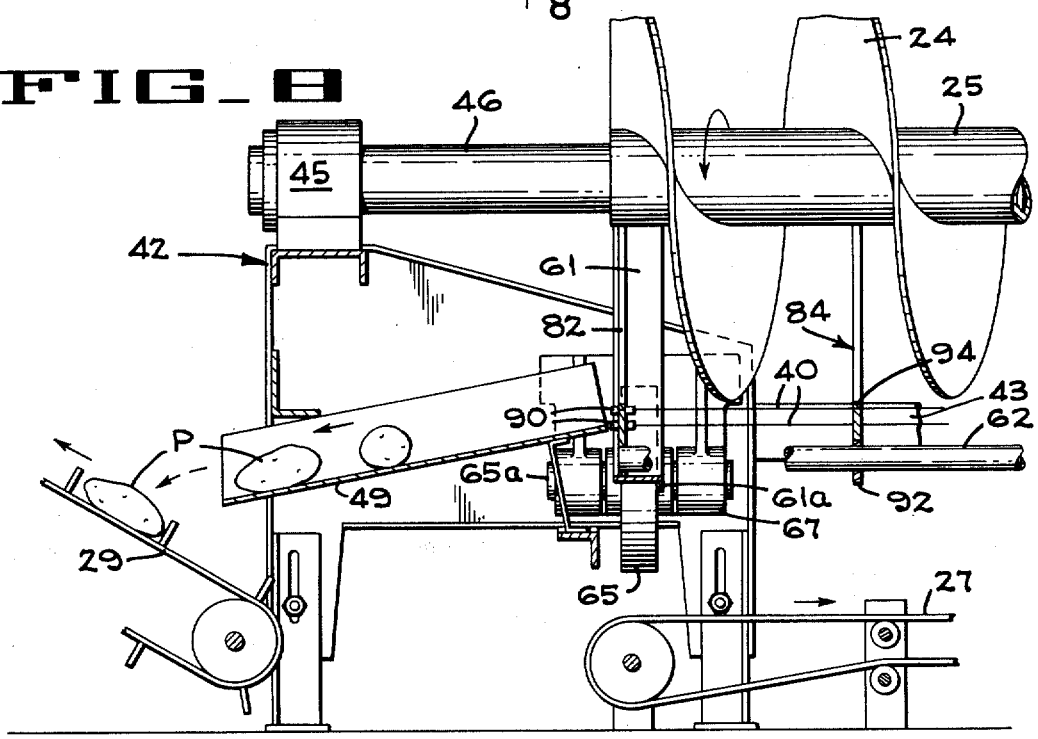
FIG. 8 is a fragmentary section taken on line 8—8 of FIG. 7 of the delivery end of the dry peeler.

FIGS. 3 and 4 illustrate major features of a preferred form of the dry peeler 20. Only major portions of the framework will be described, which framework includes end supports 41, 42 that have legs for support by the floor and are connected by side beams 43. The central helical conveyor screw or auger 24 has a rigid tubular hub 25. The auger is mounted in end bearings 44, 45 on supports 41, 42 which bearings support rigid stub shafts 46 welded to the hub 25 of the auger. The support 41 at the receiving end of the peeler 20 has a hopper 48 for receiving potatoes or other vegetables from the caustic bath 12, which hopper has a bottom 48a (FIG. 6) that is curved to match the contour of the helical auger 24. Thus, caustically treated potatoes P fall into the hopper 48, are picked up by the auger 24 and are propelled into and through the rotating abrasive cage 22, previously described. The peeled potatoes P are discharged into a chute 49 (FIG. 8).

The auger 24 is driven by a hydraulic motor 50 (FIG. 6) by means of a sprocket 51 on the motor shaft that drives a chain 52 trained around a larger sprocket 53 on the stub shaft 46 for the auger. It is to be understood that the hydraulic motor 50 is supplied with oil under pressure from a conventional hydraulic pump (not shown) and that conventional valving and pressure gauge systems (not shown) are provided in order that the speed of the hydraulic motor 50 can be selectively controlled to vary the speed of the auger 24 and hence the throughput of the apparatus. A typical speed for the auger 24 will be in the order of 20–25 RPM and the pitch of the auger will be about 1 foot per revolution.

THE ABRASIVE CAGE

The abrasive cage 22 of the dry peeler of the present invention is an elongated cylindrical envelope of wire cables 40, the cables preferably being braided of small strands of stainless steel wires to provide superior strength, abrasive qualities and cleanliness. These cables 40 are stretched in a generally axial direction along the entire length of the abrasive cage 22 and are supported at intervals of about 13 inches (in the example given) so that they can support the weight of the product being pushed and tumbled through the cage. Yet, as will be seen, the cables 40 are not stretched too tightly, but rather their tension can be adjusted to provide limited deflection of the cables during the skin removal action thereof on the product, for minimizing damage to the product and for increasing the contact zone with the product thus increasing peeling effectiveness without any substantial loss of yield.

Figure 7:
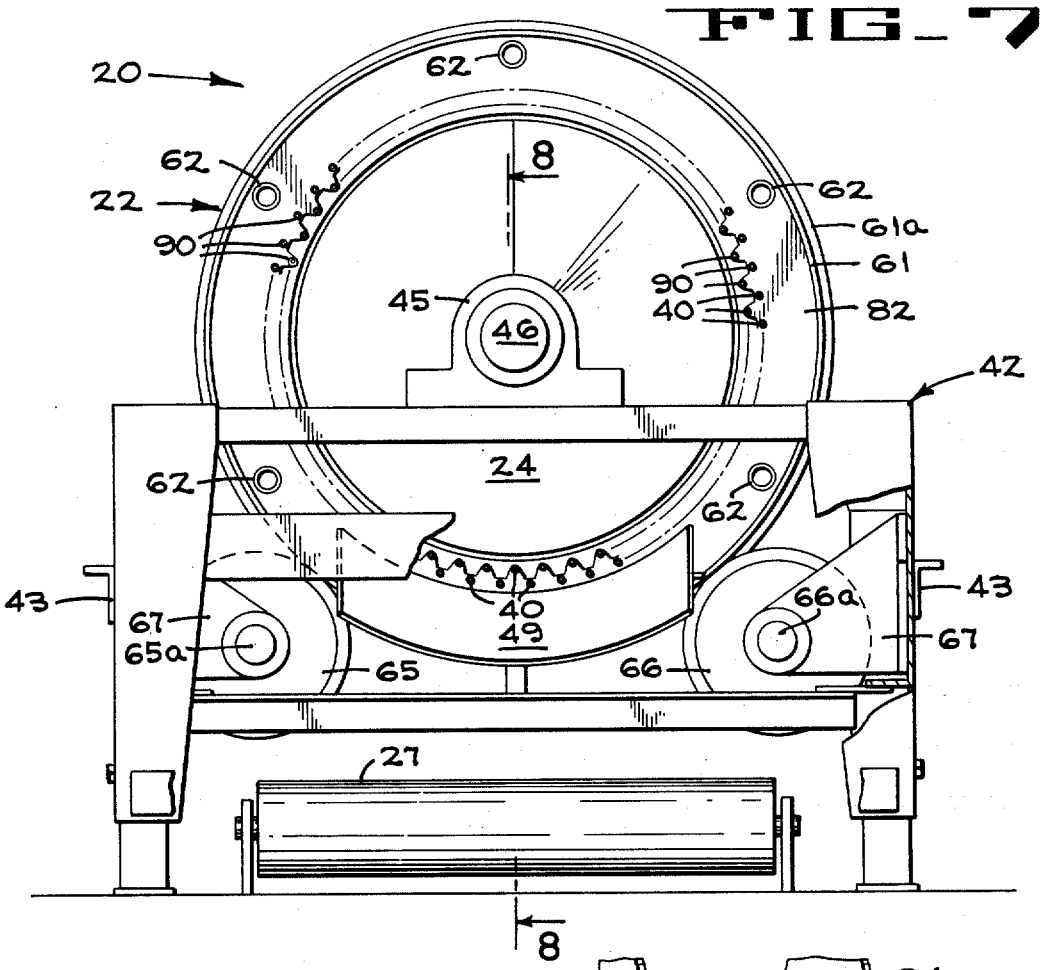
FIG. 7 is an end view of the dry peeler taken in the direction of arrows 7—7 on FIG. 4 with portions being broken away.

The abrasive cage 22 is of cylindrical construction and in the example being given has an outside diameter of about 30–36 inches, with the envelope of cables 40 having a diameter of about 26 inches. The cage is formed of annular end rings between which extend axial ring supporting and reinforcing tubes. For example, as seen in FIGS. 3 and 4, there is an annular end ring 60 at the receiving end of the cage and a corresponding end ring 61 at the delivery end thereof, and six axial tubes 62 extend between their end rings. The end rings are each supported for rotation on two rollers adjustably mounted on the end frames 41, 42. For example, referring to FIGS. 5 and 6, the end ring 60 at the receiving end is supported on cylindrical rollers 63, 64, and the end ring 61 is mounted on rollers 65, 66 at the delivery end of the machine (FIGS. 7 and 8). Since the end rings 60, 61 are flanged at 60a, 61a (FIGS. 4, 6 and 8), the foresaid four rollers 63–66 support and locate the abrasive cage 22 for rotation. All of the aforesaid cage support rollers 63–66 are supported in paired brackets 67 projecting inwardly from the end frame elements 41, 42 of the machine. The shafts 64a, 65a, 66a for the three rollers 64, 65, 66, are simple stub shafts that mount the corresponding rollers in the spaced bracket 67, a typical construction of this roller mounting appearing in FIGS. 7 and 8.

The roller 63 at the receiving end of the machine is mounted on a longer shaft 63a which shaft turns loosely within the roller 63 and serves to rotate the abrasive cage 22. As seen in FIG. 6, the shaft 63a (partially seen in dotted lines) is driven by a hydraulic motor 70, which motor is secured to a bracket 71 (FIGS. 5 and 6) that takes up the torque of the motor by means of a bolt 73 that connects the bracket 71 to a crossbar 74 (FIG. 5) forming part of the delivery end frame structure 41. The motor shaft 63a rotates the cage 22 by means of a sprocket 72 at the inner end of the shaft (FIG. 5), which sprocket drives a chain 74 (FIG. 5) trained around a large annular channel 76 supported on one of the annular rings mounted by the aforesaid circular array of axial spacer tubes 62. An idler sprocket 77 is pressed against the chain 74 by a spring 78 to provide a friction drive of the channel 76. The hydraulic motor 70 which rotates the abrasive cage 22 is also connected in the manner of the hydraulic motor 50 that rotates the auger 24, in that the motor 70 is connected by means of a control valve and pressure gauge system to a conventional source of oil under pressure, such as a hydraulic pump, which connections, by means well known in the art, provide for independently controlling the speed of the cage driving motor 70 relative to that of the auger motor 50. Generally speaking, the speed of rotation of the cage 22 will be approximately equal to that of the auger 24, namely, about 20–25 RPM. Of course, the auger 24 and the abrasive cage 22 can be speeded up or slowed down to increase or decrease the throughput of the apparatus. Also decreasing the speed of the auger 24 relative to that of the cage 22 increases the residence time of the potatoes in the cage and vice-versa.

CABLE MOUNTING

Figures 9, 10, 11, 11A:
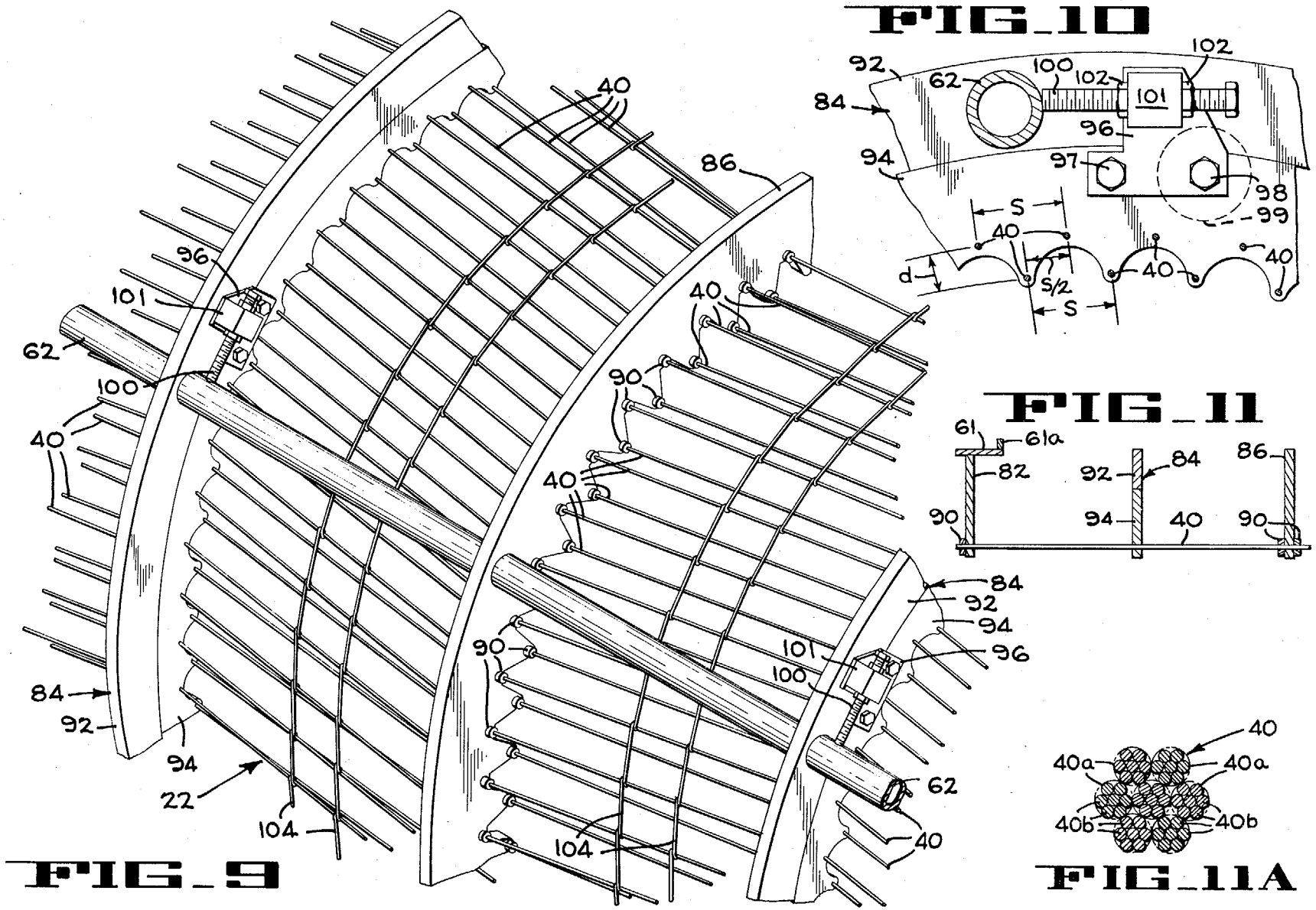
FIG. 9 is an enlarged fragmentary perspective showing the mounting of the spaced cables.
FIG. 10 is an enlarged detail showing the adjustment of certain cable mounting rings.
FIG. 11 is a diagram showing the sequence of securing the cables to the rings.
FIG. 11A is a greatly enlarged section of a braided cable shown in diagrammatic form.

The cables 40, which perform the skin removal or peeling function, are of the aircraft type, and in the form described are made of braided No. 304 stainless steel wire, each complete cable being about one-sixteenth inch in diameter. These small diameter cables provide a combined abrasion and undercutting action on the loosened skins without damaging the underlying flesh. Each cable contains about 49 small wires braided in a 7 × 7 configuration, that is, seven strands of seven wires per strand. This provides a high tensile strength cable having an abrasive surface, and yet being tightly braided, the cables are easily cleaned. FIG. 11A shows in greatly enlarged, diagrammatic form a section of one of the cables 40. In the embodiment described, the cable 40 is braided from seven multi-wire strands 40a, and each strand 40 is braided from seven small individual wires 406. Although a cable diameter of one-sixteenth inch is preferred a 3/32 inch diameter cable would not be too large to provide the undercutting action on the skins. The cables 40 are supported at intervals of about 13 inches long length of the cage on the annular rings previously mentioned, which rings are secured to the axial tubes 62. The cables are mounted in an end ring 80 at the receiving end of the apparatus (FIG. 6) and a corresponding end ring 82 at the delivery end of the apparatus (FIG. 9). A number of axially spaced, intermediate ring assemblies, to be described, are also secured to the longitudinal tubes 62.

The intermediate rings include a tension ring adjustment assembly 84 adjacent to but spaced about 13 inches from each end ring 80, 82, there being four non-adjustable cable supporting rings 86 distributed along the length of the apparatus between the end rings 80, 82. As seen in FIGS. 3 and 4, an adjustable cable mounting ring assembly 84 is mounted between each of the fixed cable mounting rings 86 as well as between the end rings 80, 82 and the nearest fixed cable mounting ring 86, providing a total of five adjustable rings 84, four intermediate non-adjustable rings 86 and the two non-adjustable end rings 80, 82. Since, in the construction being described, the various cable mounting rings are about 13 inches apart, this construction provides an adjustment of the tension of about 26 inches of the length of the cables 40 extending between the non-adjustable or fixed rings.

CABLE MOUNTING DETAILS

As previously described, the abrading cables 40 are supported in a row of annular rings, and the cables are secured to the end rings 80 (FIG. 6) and 82 (FIG. 8) and to a series of fixed rings 86 (FIGS. 9 and 11). Between each adjacent pair of non-adjustable rings, an adjustable ring mounting assembly 84 is mounted, and these adjustable ring assemblies 84 and the cable mounting details will now be described.

The cables 40 are secured to the end rings 80 and 82 and to the non-adjustable rings 86 in a convenient manner. For example, in the embodiment being described, this securement is provided by crimping ferrules 90 to the cables at the end rings 80, 82 and at both sides of the intermediate fixed rings 86. The adjustable ring assemblies 84 are formed of an outer ring 92 that is welded to the longitudinal tubes 62 and a relatively turnable or adjustable inner ring 94 which ring is provided with apertures for the cables 40, there being no ferrules 90 at the rings 94. In the first embodiment of the invention, the apertures for the cables 40 are staggered to form two concentric envelopes of the cables. As indicated in FIG. 10, the circumferential spacing s between the cables 40 in the outer envelope is equal to the spacing s between the cables 40 in the inner envelope and the cables on the envelopes are symmetrically staggered, so that the circumferential distance between a cable of the outer envelope and one of the inner envelope is equal to s/2. The radial staggering d of the cables 40 of the inner and outer envelope is, in the example given, equal to about five-eighths inch whereas the spacing s of the cables in each envelope is equal to about 1½ inches, so that s/2 equals ¾ inch.

Figure 13:
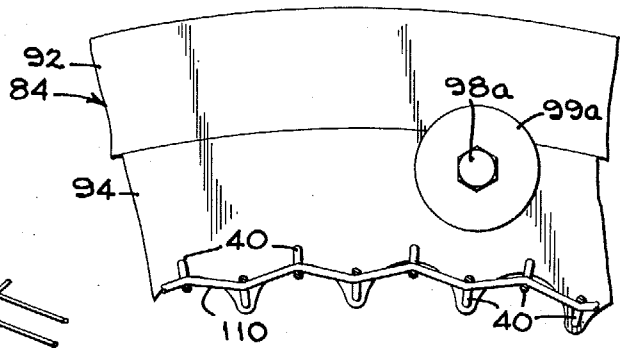
FIG. 13 is an enlarged detail showing the modified form of FIG. 12.

In order to adjust each inner ring 94 relative to its fixed outer ring 92, a bracket 96 (FIGS. 9 and 10) is bolted to one side of the inner ring 94 by bolts 97, 98. As indicated in dotted lines in FIG. 10, the bolt 98 mounts a retainer washer 99 on the opposite side of the inner ring 94 which centers the inner ring on the outer, fixed ring 92. In order to adjustably rotate the inner ring 94 relative to the outer ring 92 for determining the tension on the cables 40, an adjusting screw 100 is threaded into a nut block 101 fixed on the bracket 96. This adjusting bolt 100 bears against the adjacent axial pipe 62 which mounts the outer ring 92 and the bolt is locked in its adjusted position by lock nuts 102 (FIG. 10). As seen in FIGS. 5 and 13, additional guides for axially locating the inner, adjustable ring 90 on the outer, fixed ring 92 are provided by bolts 98a that mount large washers 99a on each side of the rings.

The cables 40 simply slie through their apertures in the adjustable rings 94 but are secured by ferrules 90 to adjacent fixed rings, so that adjustment of the bolts 100 for each of the adjustable ring assemblies 84 determines the tension and hence the operational sag of the cables during the dry peeling operation.

In order to restrict the amount of cable sag and facilitate and to support a relatively heavy load of potatoes or vegetables during the process, the mid-portions of the cables 40, that is, those portions intermediate each pair of rings 84, 86, etc., are partially restrained by non-metallic cords 104 which are laced around the mid-section of the outer envelope of the cables 40. These lacings partially support the outer envelope of the cables 40 directly and limit deflection of the cables 40 of the inner envelope to some extent during high load operation.

Figure 2:
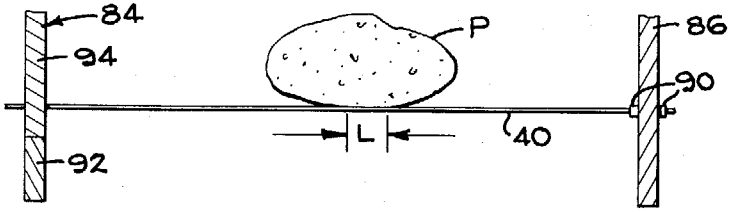
FIG. 2 is a diagram showing the action of an overly tight abrading cable on a vegetable such as a potato.
Figure 2A:
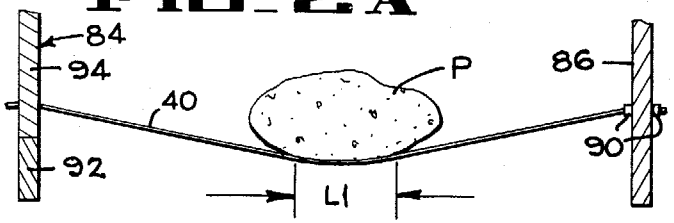
FIG. 2A is a similar diagram showing the action of deflectable cables mountd in accordance with the present invention.

The effect of selective adjustment of the tension of cable 40 is illustrated diagrammatically in FIGS. 2 and 2A. In FIG. 2, the adjustment of cables 40 is such that the cables are under as great a tension as feasible. With this condition (FIG. 2) of the cables, the length L of the zone of contact of the cable with a vegetable, such as the potato P, is relatively short. This condition, not only accentuates the danger of a cable cutting into the fruit during the peeling operation, but also shortens the length L of the zone of contact of the cables with the fruit, and hence reduces abrasion efficiency. FIG. 2A shows (in somewhat exaggerated form) adjustment of the cables in a manner which accommodates a greater degree of deflection of the cables during the peeling operation. As seen in FIG. 2A, the length L1 of the contact zone is substantially greater than the length L in the tight cable condition of FIG. 2. The resultant cable flexure reduces the unit force imparted by the cables to the potatoes or other vegetables, and also facilitates accommodation of the cables to the vegetable contour, thereby providing an efficient, non-damaging peeling action.

OPERATION

In operation on fruit or vegetables, such as the potatoes being described by way of example in this embodiment, the potatoes enter the system on the feed conveyor 10 (FIG. 1A) are dropped into a caustic bath unit 12. The caustic concentration, temperature and residence time in the bath is such that the skins of the potatoes are loosened with minimal damage to the underlying flesh, this technique being known in the art. The caustically treated vegetables are removed from the caustic bath by the transfer conveyor 18 which has an elevating reach 19 that drains excess caustic from the potatoes before they are dropped into the hopper 48 of the dry peeler 20.

On falling into the dry peeler hopper 48, the potatoes are picked up by the helical auger 24 which is rotating at about 20–25 RPM and hence forces the potatoes axially through the abrasive cage 22. The abrasive cage 22 is usually rotated at about the same speed as the auger conveyor 24. As a result of axially forcing the potatoes through the rotating abrasive cage 22 by means of the screw 24, coupled with the action of gravity on the potatoes, there is substantial relative motion between the braided wire cables 40, and the potatoes are tumbled in all directions and at random. The result is that the peels are removed as a moist sludge and fall freely through the relatively widely spaced cables 40 onto the dry peel conveyor 27. The cables 40 are relatively self cleaning and there is no build up of slippery peels thereon, which would reduce the peeling efficiency during prolonged operation. Due to the flexiblity of the cables 40, the tension of which can be adjusted as previously described, the length of contact L1 (FIG. 2A) of the cables with the potatoes is substantial, which minimizes marring and cutting of the fruit and increases the length of the zone of the abrasive action on the fruit. The peeled potatoes P, which will have had about 85–90 percent of the peelings removed, are deposited into the chute 49 (FIGS. 7 and 8) at the delivery end 42 of the dry peeler fot pickup by the transfer conveyor 29. The peels fall readily through the cables 40 onto the dry peel conveyor 27, as described. Final clean up is provided by the brush clean up device 30, as was also previously described. The apparatus described will dry peel about 20,000 pounds of pretreated potatoes per hour.

MODIFIED FORMS

Figure 12:
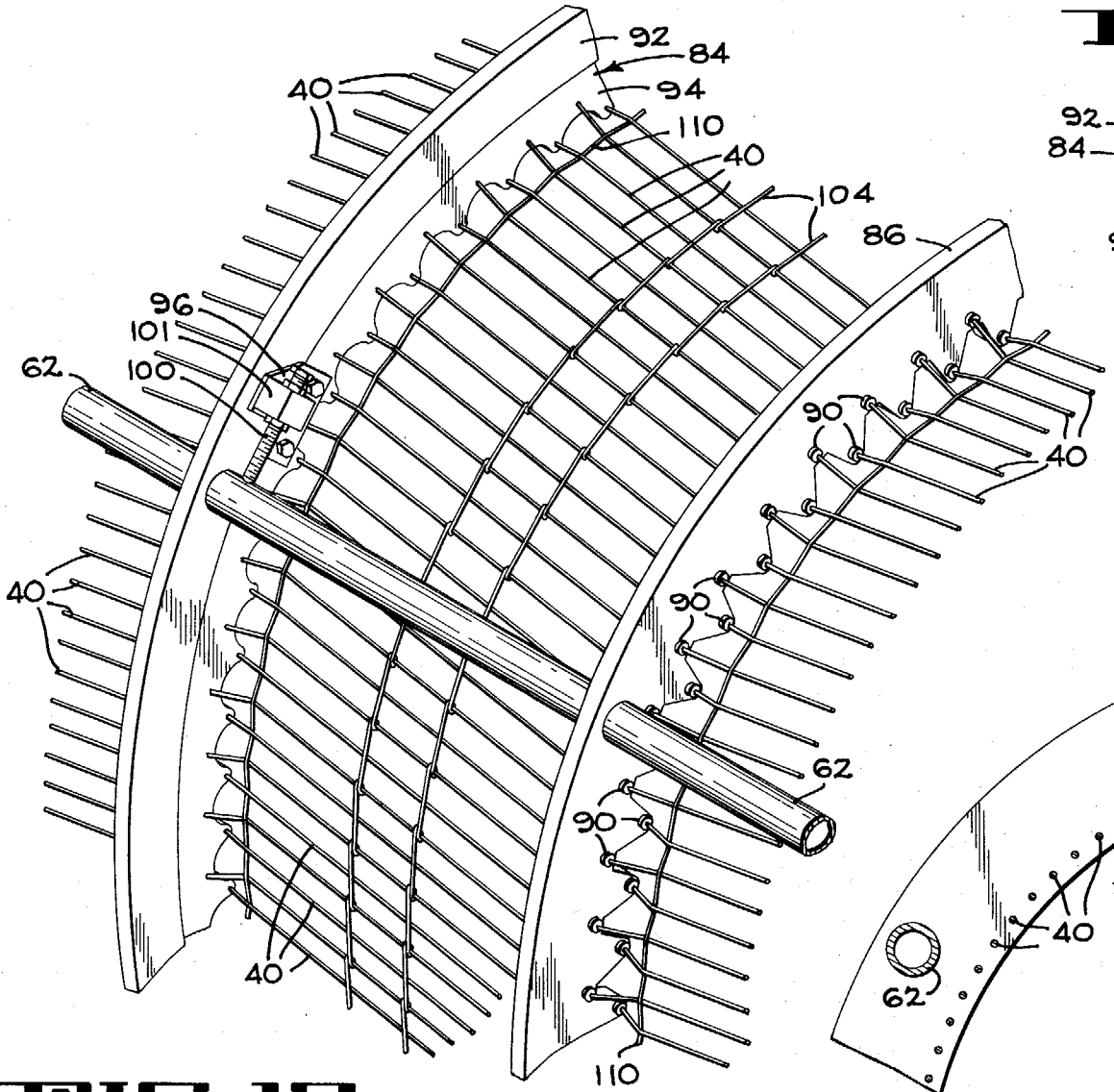
FIG. 12 is a perspective like FIG. 9 showing a modified form of cable mounting.

FIGS. 12 and 13 show a modified form of the invention wherein the radial spacing d between the inner and outer envelopes of the cables 40 shown in FIG. 10 is reduced to bring the cables closer to concentricity. This is accomplished by threading a strong wire or cable 110 over the outer envelope of cables and cables and under the inner envelope of cables adjacent to the rings, as clearly seen in FIGS. 12 and 13. This modification increases the abrasive or peeling action of the outer envelope of cables, particularly in zones adjacent to the supporting rings wherein a relatively large deflection of the inner envelope cables is required before the potatoes will engage the outer envelope cables.

Figure 14:
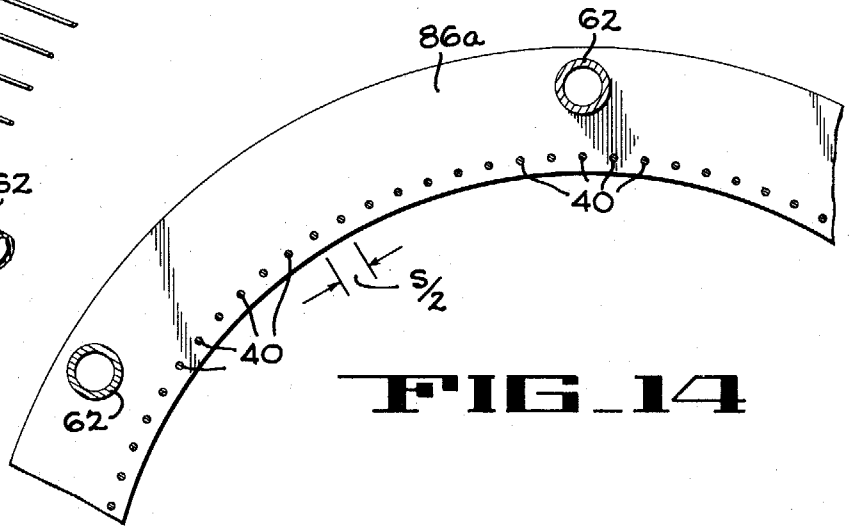
FIG. 14 is a fragmentary detail showing still another modified form of cable mounting.

FIG. 14 shows another modified form wherein the cables 40 are all concentric. This is provided by forming both the adjustable rings 94 (not shown in FIG. 14) and the non-adjustable rings 86a with a concentric array of holes to accommodate the cables 40. In this modification, all the cables contribute equally to the peeling action and their circumferential spacing s/2 is equal to about ¾ inch. The general mode of operation of the embodiments of FIGS. 12–14 is substantially the same as described for the first embodiment and detailed descriptions are not necessary.

Although the best mode contemplated for carrying out the present invention has been herein shown and described, it will be apparent that modification and variation may be made without departing from what is regarded to be the subject matter of the invention.

I claim:

1. A peeler for generally spheroidal food products such as vegetables, potatoes or the like which have been treated to soften their skins for removal, said peeler being of the type that provides a rotary cage having an open abradant surface, means for rotating the cage, means for propelling the products longitudinally through the cage, means for feeding treated products to the cage, and means for removing peels that fall from the cage; the improvement wherein said cage comprises a pair of end support rings, at least one intermediate support ring and an abradant envelope formed of longitudinally extending, circumferentially spaced, straight braided steel wire cables supported on said rings, means for tensioning said cables sufficiently to maintain their generally longitudinal direction under product load while accommodating sufficient deflection of the cables under product load to cause the cables to partially conform to the product contour and hence to provide an abradant, supporting contact of substantial longitudinal extent with the generally spheroidal products, said cables being spaced by a distance that is several times greater than the cable diameter.

2. The peeler of claim 1, wherein said cables are formed of braided stainless steel wire and are about three thirty-seconds inches in diameter.

3. The peeler of claim 1, wherein said means for propelling the products longitudinally through the cycle comprises a helical conveyor that is of substantially the same diameter as the envelope of cables, and means for rotating said conveyor independently of the cage.

4. A dry peeler for food products such as vegetables, potatoes or the like which have been treated to soften their skins for dry removal, said peeler being of the type that provides a rotary cylindrical cage having an abradant surface, means for rotating said cage, means for propelling the products through said cage, means for feeding treated products to the cage, and means for removing peels that fall from the cage, the improvement wherein said cage comprises a plurality of axially spaced wire mounting rings, and an abradant envelope of axially extending, circumferentially spaced wires supported on and stretched between said rings, said wires being stretched sufficiently to maintain the generally cylindrical nature of their envelope but being loose enough to be sufficiently deflected by the products to cause the wires to conform to the product contour and hence provide an abradant, supporting contact of substantial extent with the products, said means for propelling the products through the cage comprising a helical conveyor that is of substantially the same diameter as the envelope of wires, means for rotating said helical conveyor independently of the means for rotating said cage, and means for adjusting the speed of the conveyor relative to that of the cage.

5. A dry peeler for products such as vegetables, potatoes or the like which have been treated to soften their skins for dry removal, said peeler being of the type that provides a rotary cylindrical cage having an abradant surface, means for rotating said cage, means for propelling the products through said cage, means for removing peels that fall from the cage; the improvement wherein said cage comprises a plurality of axially spaced wire mounting rings, and an abradant envelope of axially extending, circumferentially spaced wires supported on and stretched between said rings, said wires being stretched sufficiently to maintain the generally cylindrical nature of their envelope but being loose enough to be sufficiently deflected by the products to cause the wires to conform to the product contour and hence provide an abradant, supporting contact of substantial extent with the products, said wire mounting rings comprising end rings and an intermediate ring, and means for adjustably turning one ring relative to an adjacent ring to adjust the tension of said wires.

6. The dry peeler of claim 5, wherein said one ring comprises a fixed outer ring and a relatively adjustable inner ring that mounts the wires.

*7. A peeler for generally spheroidal food products such as fruit, vegetables, potatoes or the like which have been treated to soften their skins for removal, said peeler being of the type that provides a rotary cage having an open abradant surface, means for rotating the cage, means for propelling the products longitudinally through the cage, means for feeding treated products to the cage, and means for removing peels that fall from the cage; the improvement wherein said cage comprises a pair of end rings, axially spaced intermediate annular support means and an abradant envelope formed of longitudinally extending, circumferentially spaced, straight cord-like tension members mounted on said support means, means for tensioning said members sufficiently to maintain their generally longitudinal direction under product load while accommodating sufficient deflection of the members under product load to cause the members to partially conform to the product contour and hence to provide an abradant, supporting contact of substantial longitudinal extent with the generally spheroidal products, said members being spaced by a distance that exceeds their diameter.*

* * * * *